(12) United States Patent
Yamamoto et al.

(10) Patent No.: US 6,559,901 B2
(45) Date of Patent: *May 6, 2003

(54) ILLUMINATION OPTICAL SYSTEM AND PROJECTION TYPE DISPLAY APPARATUS USING THE SAME

(75) Inventors: Chikara Yamamoto, Omiya (JP); Takashi Watanabe, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 101 days.

This patent is subject to a terminal disclaimer.

(21) Appl. No.: 09/772,882

(22) Filed: Jan. 31, 2001

(65) Prior Publication Data

US 2001/0015775 A1 Aug. 23, 2001

(30) Foreign Application Priority Data

Feb. 18, 2000 (JP) .................................. 2000-040731

(51) Int. Cl.[7] ........................... G02F 1/1335; G02F 1/13
(52) U.S. Cl. ................. 349/5; 349/9; 349/194
(58) Field of Search ............... 349/5, 9, 194; 250/205; 359/267

(56) References Cited

U.S. PATENT DOCUMENTS

| 5,591,958 | A | * | 1/1997 | Nishi et al. ............... 250/205 |
| 6,078,381 | A | * | 6/2000 | Suzuki et al. .............. 355/53 |
| 6,100,515 | A | * | 8/2000 | Nishi et al. ............... 250/205 |
| 6,147,802 | A | * | 11/2000 | Itoh et al. ................. 359/500 |
| 6,337,759 | B1 | * | 1/2002 | Yamamoto ................ 359/267 |

FOREIGN PATENT DOCUMENTS

JP          402049303 A   *   2/1990

* cited by examiner

Primary Examiner—Julie Ngo
(74) Attorney, Agent, or Firm—Snider & Associates; Ronald R. Snider

(57) ABSTRACT

In an illumination optical system comprising a light source unit, an integrator unit for homogenizing a luminous flux from the light source unit, and a light valve for modulating light from the integrator unit according to predetermined image information and outputting thus modulated light; effective luminous flux quantity adjusting means adapted to adjust a light quantity caused by an effective luminous flux on the light valve is disposed within or near the integrator unit.

9 Claims, 8 Drawing Sheets

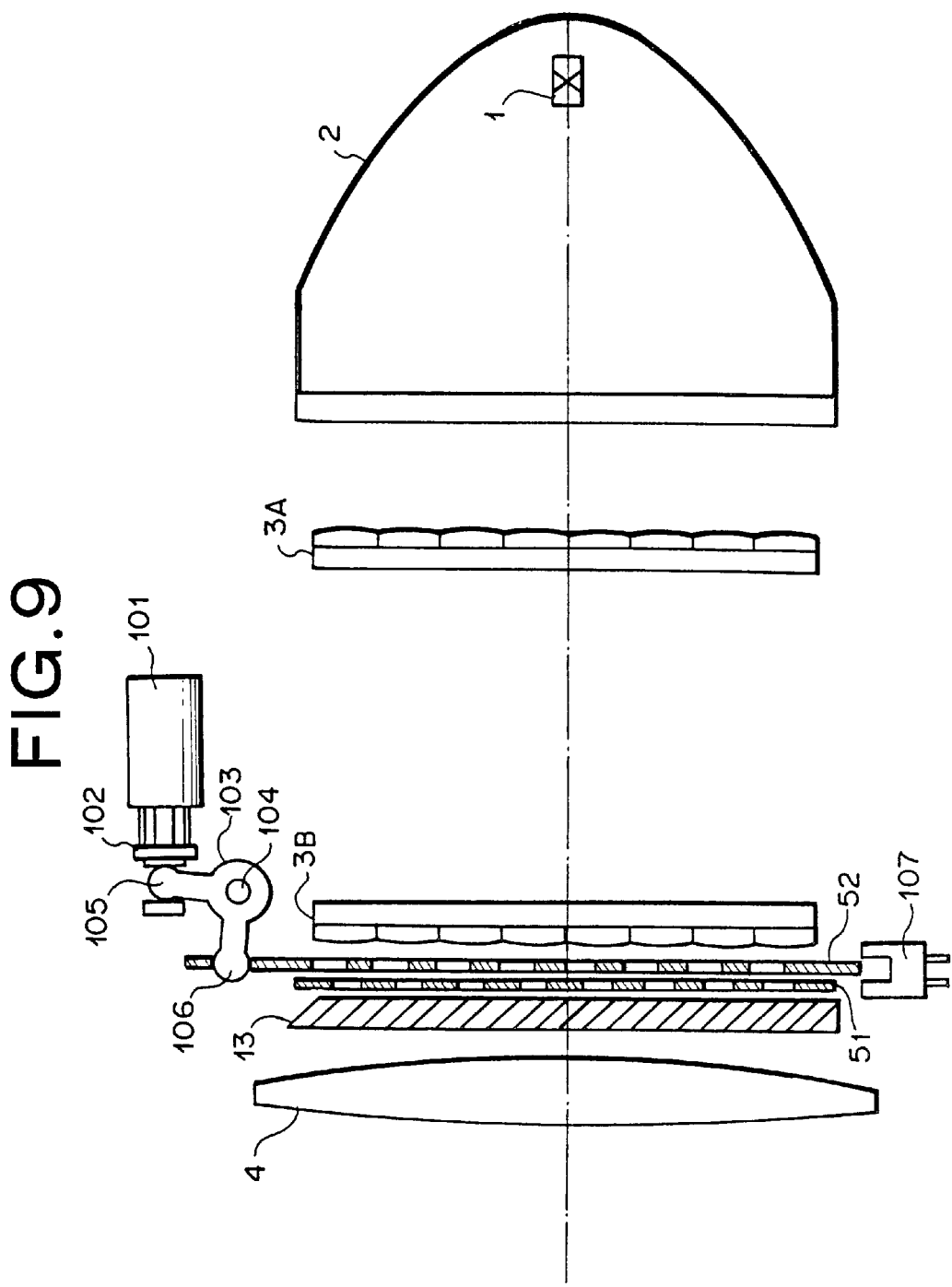

ILLUMINATION OPTICAL SYSTEM AND PROJECTION TYPE DISPLAY APPARATUS USING THE SAME

RELATED APPLICATIONS

This application claims the priority of Japanese Patent Application No. 2000-040731 filed on Feb. 18, 2000, which is incorporated herein by reference.

BACKGROUND OF THE INVENTION

1. Field of the Invention

The present invention relates to an illumination optical system for illuminating a liquid crystal display panel or DMD (digital micromirror device), and a projection type display apparatus using this illumination optical system.

2. Description of the Prior Art

Recently, in projection type display apparatus using a light valve such as a liquid crystal, individual constituents have been improved and so forth, whereby those having a higher efficiency and brightness have been developed year after year. For homogenizing the light quantity within the cross section of a luminous flux on the light valve, on the other hand, two integrator plates each comprising a number of lens arrays arranged two-dimensionally are disposed in parallel on the optical axis.

Since it has become possible for projection type display apparatus to illuminate a light valve with bright and uniform light as such, they have come into a wider use. On the other hand, problems have been occurring in that, depending on the place where they are used or their application, images displayed on their screens become too bright to be seen or make viewers fatigue.

Hence, the brightness of illumination light may be adjusted depending on the place of use and the application.

When adjusting the brightness of incident light in a typical optical system, a lens part is provided with a stop, and the amount of opening of this stop is regulated.

Therefore, a projection lens part in a projection type display apparatus may be provided with a stop, which is operated so as to adjust the brightness of illumination light.

If a projection lens is provided with a stop, which is operated so as to adjust the brightness, then the luminous flux whose diameter is to be adjusted by this stop must have been modulated by a light valve beforehand and thus carries image information. As a consequence, errors in the form, position, and operation of the stop greatly affect the image quality. In particular, the stop thermally deforms upon high-temperature heating due to the illumination light, whereby its accompanying deterioration in image quality is not negligible.

Since the temperature of stop member rises as such, it is necessary to provide a cooling structure therefor.

SUMMARY OF THE INVENTION

In view of such circumstances, it is an object of the present invention to provide an illumination optical system which can adjust the brightness of illumination light without affecting the image quality and without necessitating a cooling structure in particular, and a projection type display apparatus using the same.

The present invention provides an illumination optical system comprising:

a light source unit;

an integrator unit in which a plurality of integrator plates each comprising a number of lens arrays arranged two-dimensionally are disposed so as to homogenize a luminous flux from the light source unit; and a light valve for modulating light from the integrator unit according to predetermined image information and outputting thus modulated light;

wherein effective luminous flux quantity adjusting means adapted to adjust a light quantity caused by an effective luminous flux on the light valve is disposed within or near the integrator unit.

In the case where a polarization beam splitter having a comb-shaped polarization separating prism array and a ½ wavelength plate is disposed on the light valve side of the integrator unit, the polarization beam splitter may be made movable in a direction in which the light quantity caused by the effective luminous flux on the light valve is adjustable.

In the case where a polarization beam splitter having a comb-shaped polarization separating prism array and a ½ wavelength plate is disposed on the light valve side of the integrator unit, a light-shielding plate may be disposed between the integrator unit and the polarization beam splitter, and made movable in a direction orthogonal to an optical axis so as to adjust a quantity of light incident on the polarization beam splitter.

A light-shielding plate may be disposed on the light valve side of the integrator unit and made movable in a direction orthogonal to an optical axis so as to adjust a quantity of light emitted from the integrator unit.

Among a plurality of integrator plates constituting the integrator unit, at least one integrator plate may be provided with effective luminous flux quantity adjusting means for adjusting the light quantity caused by the effective luminous flux on the light valve.

Also, the present invention provides an illumination optical system comprising:

a light source unit;

an integrator unit in which a plurality of integrator plates each comprising a number of lens arrays arranged two-dimensionally are disposed so as to homogenize a luminous flux from the light source unit; and a light valve for modulating light from the integrator unit according to predetermined image information and outputting thus modulated light;

wherein, among a plurality of integrator plates constituting the integrator unit, at least one pair of integrator plates arranged in an optical axis direction have a distance therebetween which is changeable so as to adjust a light quantity caused by an effective luminous flux on the light valve.

Further, the present invention provides a projection type display apparatus comprising one of the above-mentioned illumination optical systems, and a projection lens for projecting onto a screen an optical image carried by light modulated by the light valve.

In the illumination optical system and projection type display apparatus in accordance with the present invention, a structure adapted to adjust the effective luminous flux diameter of illumination light is provided near an integrator unit for homogenizing the light quantity of the luminous flux from a light source.

Since positions near the integrator plate located on the light valve side are set so as to be optically conjugate with the pupil position of a projection lens, regulating a luminous flux near the integrator unit can yield effects on a par with those obtained when the projection lens is provided with a stop so as to regulate the luminous flux.

Even when the luminous flux is adjusted by the integrator unit, the luminous flux is in a state carrying no image information, whereby errors in its adjustment can affect the image quality very little.

Also, since the integrator unit is cooled by a cooling structure inherently disposed in the illumination optical system, it is not necessary to provide separate cooling structures.

BRIEF DESCRIPTION OF THE DRAWINGS

FIG. 9 is a schematic view showing a mechanism for moving a light-shielding plate in Embodiment 1 of the present invention;

DESCRIPTION OF THE PREFERRED EMBODIMENTS

Figure 1:
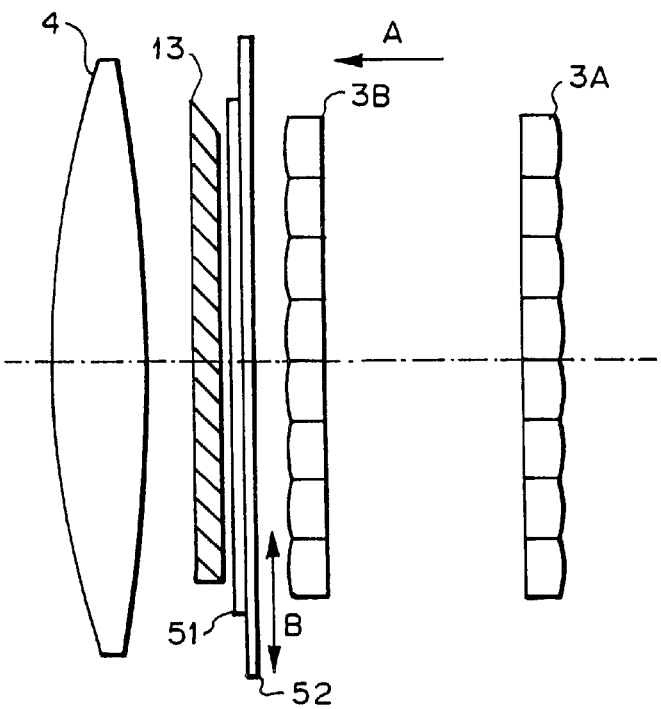
FIG. 1 is a schematic view showing a partial configuration of the projection type display apparatus in accordance with Embodiment 1 of the present invention.

In the following, illumination optical systems and projection type display apparatus in accordance with embodiments of the present invention will be explained with reference to the drawings.

First, a basic configuration of a projection type display apparatus on which the present invention is based will be explained with reference to a liquid crystal projector apparatus shown in FIG. 11.

As depicted, this liquid crystal projector apparatus comprises a light source having a light-emitting member 1 for emitting white light and a reflector 2 constituted by a parabolic mirror for reflecting the white light from the light-emitting member 1; an integrator unit 3 for homogenizing the light quantity within a cross section perpendicular to the optical axis; a condenser lens 4 for collecting the output light from the integrator unit 3; first and second dichroic mirrors 5, 6 for separating the white light collected by the condenser lens 4 into three color light components of blue, green, and red; first, second, and third liquid crystal panels 7, 8, 9 for modulating according to predetermined image information the respective color light components separated by the first and second dichroic mirrors 5 and 6; a three-color combining prism 10 for combining the respective color light components modulated by the liquid crystal panels 7, 8, 9; and a projection lens 11 for forming an image of the composite light combined by the three-light combining prism 10 onto a screen. While the liquid crystal panels 7, 8, 9 are of transmission type, transmission-type liquid crystal panels will be simply referred to as liquid crystal panels in this specification.

Figure 11:
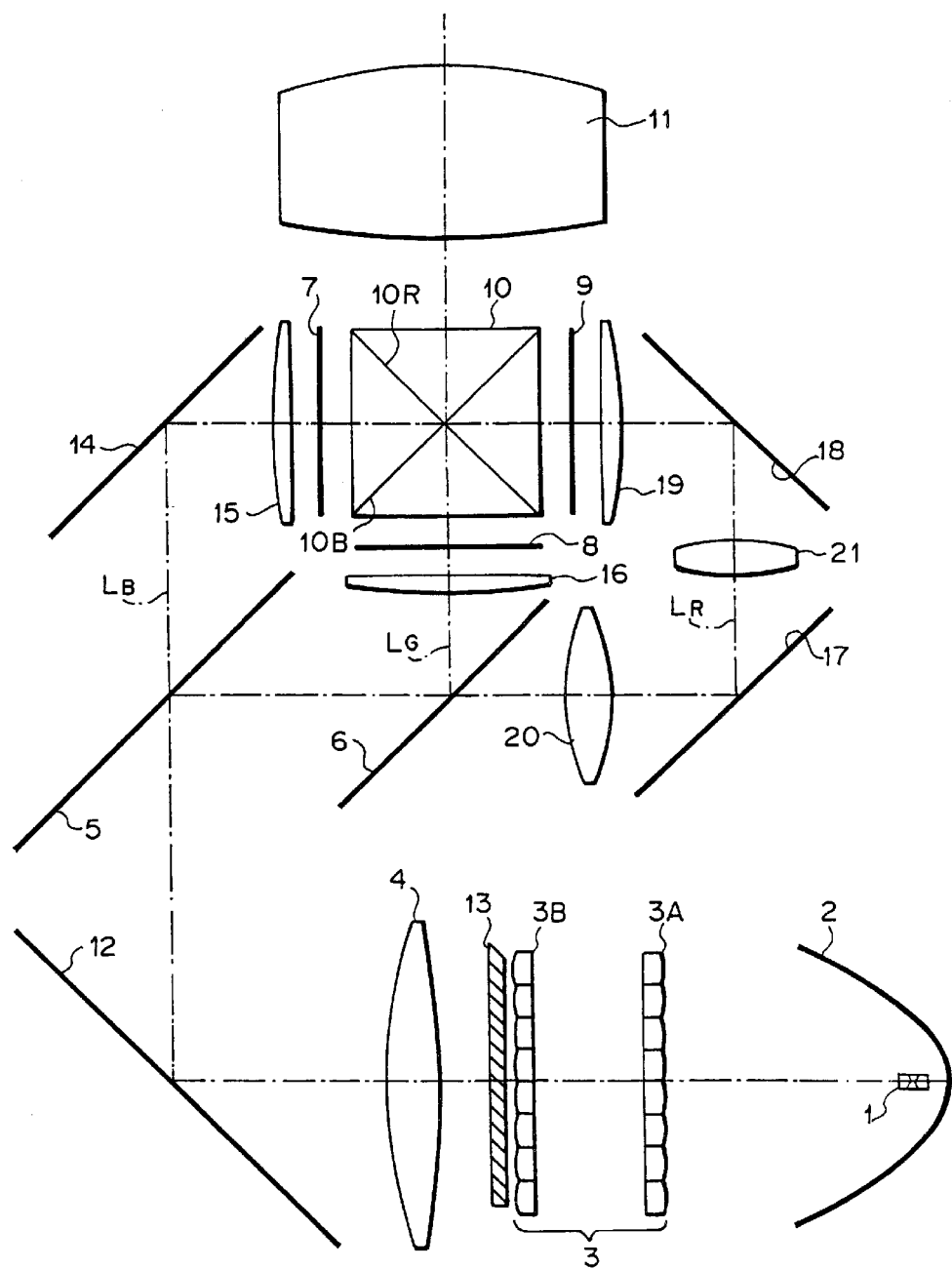
FIG. 11 is a schematic view showing a basic configuration of a projection type display apparatus on which the present invention is based.

Also, as shown in FIG. 11, a total reflection mirror 12 for reflecting the output light from the integrator unit 3 so as to direct it to the condenser lens 4 is disposed on the optical path between the integrator unit 3 and condenser lens 4.

The integrator unit 3 comprises a second flyeye 3A (first integrator plate) acting on the luminous flux from the light-emitting member 1, and a first flyeye 3B for superposing individual luminous fluxes from the second flyeye 3A (first integrator plate) onto each of the liquid crystal panels 7, 8, 9. Disposed downstream the first flyeye 3B on the optical axis is a PBS plate 13, aimed at improving the light quantity utilization efficiency, for separating the luminous fluxes homogenized by the integrator unit 3 into P- and S-polarized light components, causing both of the polarized light components to have one of the polarized states, and then outputting them as parallel rays.

Color light components may be separated in various manners by the first and second dichroic mirrors 5, 6 depending on the incident direction of luminous flux and the positions of mirrors. For example, they are separated in the following manner in this embodiment.

Namely, in the first dichroic mirror 5, each luminous flux homogenized by the integrator unit 3 and polarized by the PBS plate 13 is separated into a B component $L_B$ and GR components $L_G$, $L_R$. In the second dichroic mirror 6, the GR components $L_G$, $L_R$ isolated by the first dichroic mirror 5 are separated into a G component $L_G$ and an R component $L_R$.

Thus obtained individual color light components are projected onto their corresponding liquid crystal panels 7, 8, 9.

Namely, as shown in FIG. 11, a first mirror 14 for totally reflecting the B component $L_B$ toward the first liquid crystal panel 7 for displaying a B component image, and a field lens 15 for turning the B component $L_B$ reflected by the first mirror 14 into parallel light are disposed on the optical path of the B component $L_B$ reflected and isolated by the first dichroic mirror 5, whereby the B component $L_B$ is projected onto the first liquid crystal panel 7.

Also, as shown in FIG. 11, a field lens 16 for turning the G component $L_G$ into parallel light is disposed on the optical path of the G component $L_G$ reflected and isolated by the second dichroic mirror 6, whereby the G component $L_G$ is projected onto the second liquid crystal panel 8 for displaying a G component image.

Further, as shown in FIG. 11, second and third mirrors 17, 18 for totally reflecting the R component $L_R$ toward the third liquid crystal panel 9 for displaying an R component image, and field lenses 19, 20 for turning the R component $L_R$ reflected by the second dichroic mirror 6 into parallel light are disposed on the optical path of the R component $L_R$ reflected and isolated by the second dichroic mirror 6, whereby the R component $L_R$ is projected onto the third liquid crystal panel 9.

Though the optical path length of the R component $L_R$ to the three-color combining prism 10 differs from that of the other color light components in this projection optical system, a relay lens 21 is disposed between the second and third mirrors 17, 18, which corrects the optical path of the R component $L_R$ so as to make it apparently identical to the optical path of B component $L_B$ and G component $L_G$.

The three-color combining prism 10 is a cross dichroic prism having a dichroic surface 10B for reflecting the B component $L_B$ and a dichroic surface 10R for reflecting the R component $L_R$.

Meanwhile, as the intensity of light illuminating liquid crystals has been becoming higher year after year, problems have been occurring in that, depending on the place where they are used or their application, images displayed on their screens become too bright to be seen or make viewers fatigue.

Therefore, a member which can adjust the effective luminous flux diameter of illumination light is disposed near the integrator unit 3 in this liquid crystal projector apparatus.

In particular, since positions near the integrator plate 3B facing the liquid crystal panels 7, 8, 9 are set so as to be optically conjugate with the pupil position of the projection lens 11, regulating a luminous flux near the integrator plate 3B can yield effects on a par with those obtained when the projection lens 1 is provided with a stop so as to regulate the luminous flux.

Even when a luminous flux is adjusted by the integrator unit 3, the luminous flux is in a state carrying no image information, whereby it is advantageous in that errors in its adjustment can affect the image quality very little. Further, since the integrator unit 3 is in a state cooled by a cooling structure inherently disposed in the illumination optical system, it is advantageous in that no separate cooling structures are necessary.

Figure 2A:
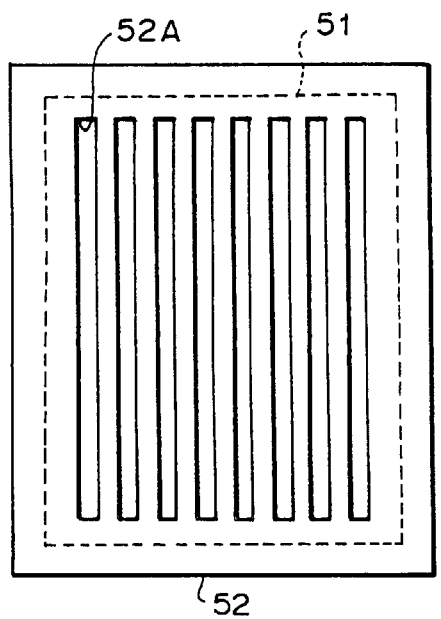
FIGS. 2A and 2B are schematic views of the projection type display apparatus shown in FIG. 1 as seen in the direction of arrow A.
Figure 2B:
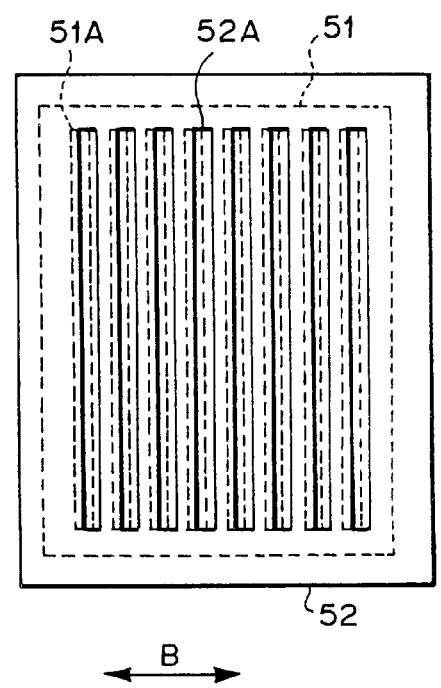

With reference to FIGS. 1 and 2A and 2B, the effective luminous flux quantity adjusting means of the display apparatus in accordance with Embodiment 1 will now be explained. FIG. 1 is a plan view showing this effective luminous flux quantity adjusting means. The effective luminous flux quantity adjusting means is disposed between the first flyeye 3B facing the liquid crystal panels 7, 8, 9 and the PBS plate 13 (constituted by a comb-shaped polarization separating prism array and a ½ wavelength plate), and comprises a first light-shielding plate 51 fixed with respect to the PBS plate 13, a second light-shielding plate 52 disposed near the first light-shielding plate 51 so as to be movable in directions of arrows B (orthogonal to the optical axis), and a light-shielding-plate driving member which will be explained later.

Figure 12A:
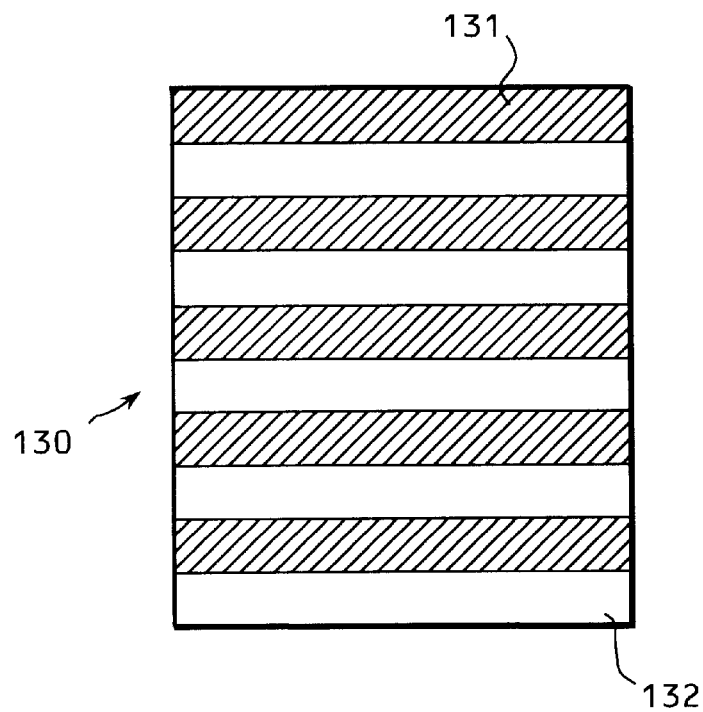
FIGS. 12A and 12B are views of a polarization beam splitter having a comb-shaped polarization separating prism array and half wavelength plate.
Figure 12B:
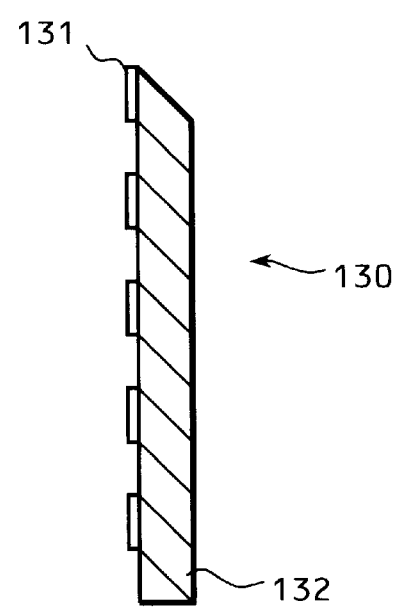

The PBS plate 13, as noted above, may be constituted by a comb-shaped polarization separating prism array and half wavelength plate. FIGS. 12A and 12B show such a plate. A PBS plate 130 and half wavelength plate 131 are shown. Also shown in FIGS. 12A and 12B is the surface 132 of the prism array.

Each of the first and second light-shielding plates 51, 52 comprises a plurality of elongated slits 51A, 52A formed at a predetermined pitch. The comb-shaped polarization separating prism constituting the PBS plate 13 comprises a plurality of polarization prism elements arranged in the directions of arrows B. The first light-shielding plate 51 is disposed in front of the comb-shaped polarization separating prism array so that the illumination light from the individual lens elements of the first flyeye 3B is made incident on every other polarization beam splitter elements in order to set the polarization to one of P and S states.

The effective luminous flux quantity adjusting means of Embodiment 1 utilizes the first light-shielding plate 51 originally disposed in combination with the PBS plate 13, and additionally provides the second light-shielding plate 52 made movable so as to face the first light-shielding plate 51.

If the quantity of illumination light from the light source is to be utilized at the maximum, then the two light-shielding plates 51, 52 are arranged such that their respective slits 51A, 52A completely overlap each other as shown in FIG. 2A, whereby the opening area through which the luminous flux passes in the direction of arrow A is maximized. If the quantity of illumination light from the light source is to be reduced, by contrast, then the second light-shielding plate 52 is moved in the directions of arrows B relative to the first light-shielding plate 51 as shown in FIG. 2B, so that their respective slits 51A, 52A shift from each other, thereby decreasing the opening area through which the luminous flux passes.

Such a configuration makes it possible to utilize the first light-shielding plate 51 provided beforehand, thereby attaining a higher efficiency in terms of cost and space.

Though the widths and intervals of elongated slits 51A, 52A formed in the first and second light-shielding plates 51, 52 are set so as to yield predetermined pitches in the above-mentioned Embodiment 1, the slits 52A may be configured so as to become wider than the slits 51A at their center part. As a consequence, the attenuation factor of luminous flux becomes lower at the center part than at the marginal part, so that the attenuated luminous flux becomes darker at the marginal part, whereby the lens performance can be improved as a whole.

Figure 3:
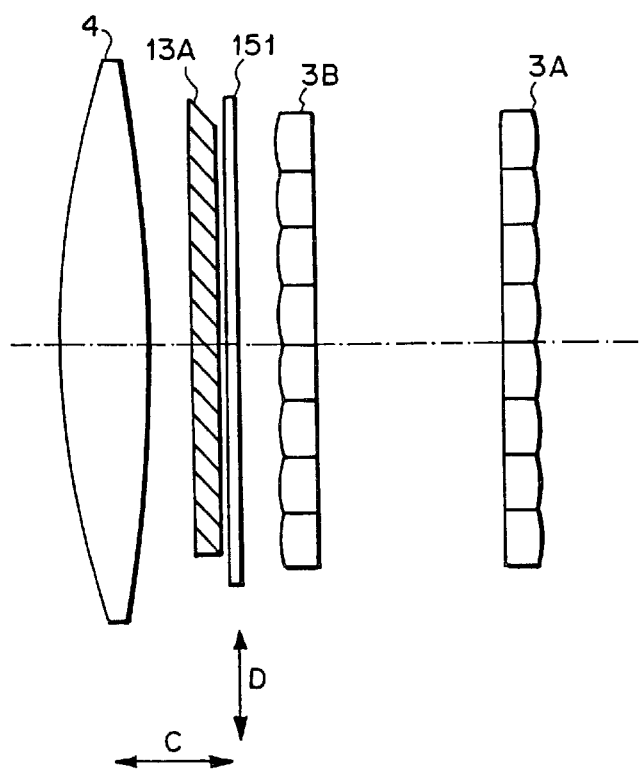
FIG. 3 is a schematic view showing a partial configuration of the projection type display apparatus in accordance with Embodiment 2 of the present invention.

FIG. 3 shows the effective luminous flux quantity adjusting means of the display apparatus in accordance with Embodiment 2. The effective luminous flux quantity adjusting means of Embodiment 2 is constituted by making a PBS plate 13A and a light-shielding plate 151 (corresponding to the first light-shielding plate 51) movable together in directions of arrows C (along the optical axis) or directions of arrows D (orthogonal to the optical axis).

The first flyeye 3B is configured such that each lens element thereof emits a luminous flux so as to form an image of the light source onto the liquid crystal panels 7, 8, 9, and is positioned such that the respective luminous flux is made incident on its corresponding slit of the light-shielding plate 151 while in a narrowed state. If the PBS plate 13A and light-shielding plate 151 are moved together in the directions of arrows C from this state, then the luminous flux diameter widens at the slit position of the light-shielding plate 151, so that the luminous flux is partly eclipsed by edge portions of the slit, whereby the quantity of luminous flux passing through the PBS plate 13A decreases.

If the PBS plate 13A and light-shielding plate 151 are moved together in the directions of arrows D from the positioned state, then the slits of light-shielding plate 151 shift in the directions of arrows D, so that each luminous flux from the first flyeye 3B is partly eclipsed by the wall face between slits, whereby the quantity of luminous flux passing through the PBS plate 13A decreases as well. The amount of movement in the directions of arrows C or D is determined according to the attenuation factor.

Figure 4:
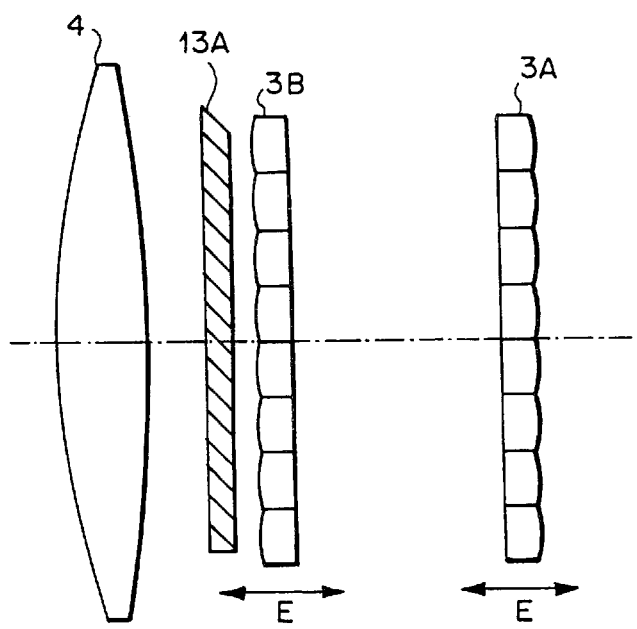
FIG. 4 is a schematic view showing a partial configuration of the projection type display apparatus in accordance with Embodiment 3 of the present invention.

FIG. 4 shows the effective luminous flux quantity adjusting means of the display apparatus in accordance with Embodiment 3, in which at least one of the flyeyes 3A, 3B constituting the integrator unit 3 is moved in directions of arrows E (along the optical axis) so as to change the distance therebetween, whereby the luminous flux diameter is changed on the liquid crystal panels 7, 8, 9. Namely, if the luminous flux diameter on the liquid crystal panel 7, 8, 9 is greater than the size of liquid crystal panel 7, 8, 9, then the light quantity per unit area of illumination light illuminating the liquid crystal panel 7, 8, 9 decreases. As a consequence, the light intensity on the screen can be kept low. In this case, the light attenuation effect can be enhanced due to the eclipse of luminous flux caused by a light-shielding plate (corresponding to the light-shielding plate 151 of Embodiment 2) which is not depicted.

Figure 5:
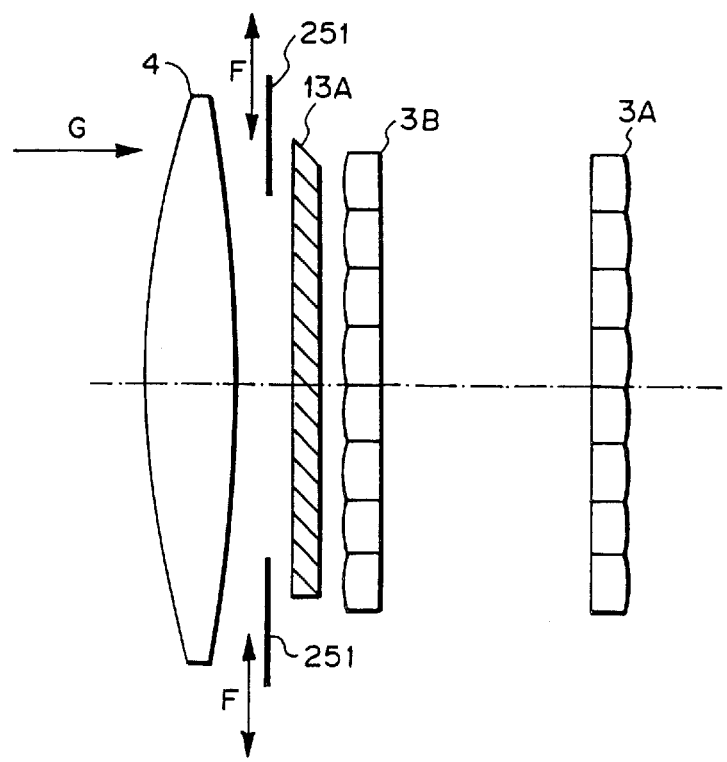
FIG. 5 is a schematic view showing a partial configuration of the projection type display apparatus in accordance with Embodiment 4 of the present invention.
Figure 6:
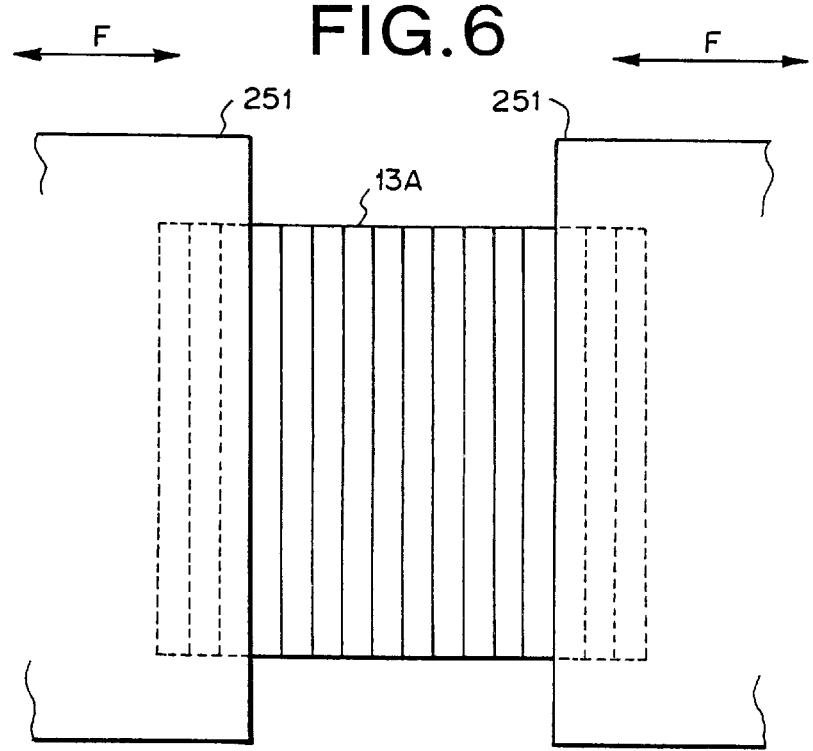
FIG. 6 is a schematic view showing the projection type display apparatus shown in FIG. 5 as seen from the direction of arrow G.

FIG. 5 shows the effective luminous flux quantity adjusting means of the display apparatus in accordance with Embodiment 4, in which the luminous fluxes emitted from the PBS plate 13A are partly blocked by a light-shielding plate 251 which is movable in directions of arrows F (orthogonal to the optical axis), so as to reduce the total light quantity of luminous fluxes illuminating the liquid crystal panels 7, 8, 9. FIG. 6 is a schematic view showing the positional relationship between the PBS plate 13A and the light-shielding plate 251 in accordance with Embodiment 4 as seen in the direction of arrow G in FIG. 5.

Consequently, if the brightness of illumination light on the liquid crystal panels 7, 8, 9 is to be maximized in this embodiment, the light-shielding plate 251 is disposed at a position where the luminous fluxes from the PBS plate 13A are not blocked. If the brightness of illumination light is to be lowered on the liquid crystal panels 7, 8, 9, then the light-shielding plate 251 is moved in the directions of arrows F from the state mentioned above, so as to block the luminous fluxes from both of the side areas of the PBS plate 13A according to a desirable attenuation factor.

Even when luminous fluxes from a part of the area of PBS 13A are blocked as such, each luminous flux from the respective element of the PBS plate 13A forms illumination light covering the whole area of each liquid crystal panel 7, 8, 9, whereby there is no fear of the illumination spot form becoming smaller on each liquid crystal panel 7, 8, 9.

Figure 7:
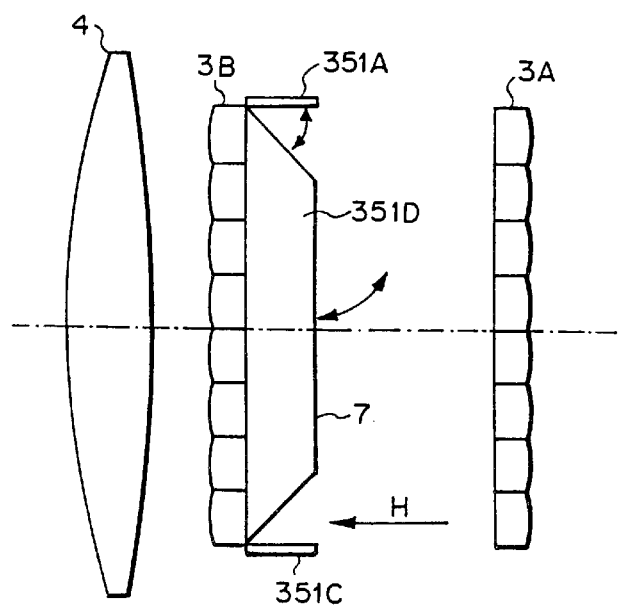
FIG. 7 is a schematic view showing a partial configuration of the projection type display apparatus in accordance with Embodiment 5 of the present invention.

FIG. 7 shows the effective luminous flux quantity adjusting means of the display apparatus in accordance with Embodiment 5 of the present invention.

Figure 8A:
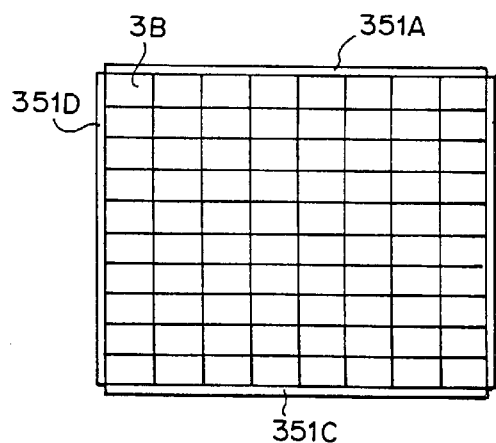
FIGS. 8A and 8B are schematic views of the projection type display apparatus shown in FIG. 7 as seen in the direction of arrow H.

In this effective luminous flux quantity adjusting means, four light-shielding fins 351A to 351D adapted to open and close are disposed on the second flyeye 3A side of the first flyeye 3B. Each of the four light-shielding fins 351A to 351D has a predetermined trapezoidal form. If the brightness of illumination light is to be maximized, then the light-shielding fins 351A to 351D are placed in their open state as shown in FIG. 8A (which is a view seen in the direction of arrow H, ditto for FIG. 8B), so that the luminous fluxes can pass through the whole area of the first flyeye 3B. If the brightness of illumination light is to be reduced, by contrast, then the light-shielding fins 351A to 351D are placed in their closed state as shown in FIG. 8B, so that the luminous fluxes can pass through only the center area of the first flyeye 3B.

Figure 8B:
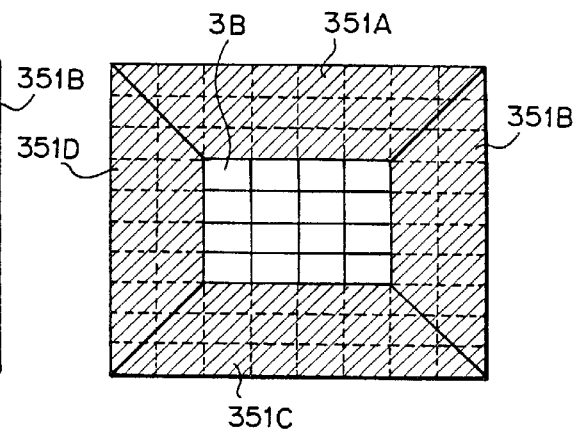

Even when the luminous fluxes can pass through only the center area of the first flyeye 3B as shown in FIG. 8B, there is no fear of the illumination spot form becoming smaller on each liquid crystal panel 7, 8, 9 since the luminous flux passing through each lens element of the first flyeye 3B is configured to illuminate the whole area of each liquid crystal panel 7, 8, 9.

Though the light-shielding fins 351A to 351D adapted to open and close are disposed on the second flyeye 3A side of the first flyeye 3B in Embodiment 5, such light-shielding members may be disposed on the condenser lens 4 side of the first flyeye 3B or either side of the second flyeye 3A. Nevertheless, disposing them between the two flyeyes 3A, 3B is advantageous in terms of space.

As explained in the foregoing, various members are moved near the first flyeye 3B at positions optically conjugate with the pupil position of the projection lens 11, so as to adjust the light quantity of effective luminous flux in each of the above-mentioned embodiments.

The moving mechanism here may be any means as long as it can move each member with a predetermined precision. Known mechanisms for moving members used in various optical apparatus can be employed.

Mechanisms for moving the second light-shielding plate 52 in the above-mentioned Embodiment 1 will now be explained with reference to the drawings.

FIG. 9 is a mechanism by which the second light-shielding plate 52 is made switchable between two positions separated from each other in the directions of arrows B in FIG. 1. Namely, as the solenoid of a plunger (magnet holding type plunger) 101 is turned ON/OFF, a rod 102 is switchable between two positions, i.e., its projected and retracted positions. As a consequence, a rotary lever 103, rotatably attached to an axis 104, having one arm 105 axially supported by the rod 102 and the other arm 106 axially supported by the second light-shielding plate 52 is made switchable between two rotary positions, so that the second light-shielding plate 52 is movable between two positions orthogonal to the optical axis direction relative to the first light-shielding plate 51. Namely, in the state where the solenoid of plunger 101 is turned ON (the state shown in FIG. 9), the rod 102 is retracted into the plunger 101, so that the rotary lever 103 pivots rightward, whereby the second light-shielding plate 52 moves upward in this drawing. Consequently, the slits 51A of first light-shielding plate 51 and the slits 52A of second light-shielding plate 52 are positioned so as to overlap each other by ½ of the width of each slit 51A, 52A (in the state of FIG. 2B), whereby the quantity of luminous flux passing through the PBS plate 13 decreases to about a half of the maximum value thereof.

In the state where the solenoid of plunger 101 is turned OFF, the rod 102 projects from the state shown in FIG. 9, so that the rotary lever 103 pivots leftward, whereby the second light-shielding plate 52 moves downward in FIG. 9. As a consequence, the respective slits 51A, 52A of two light-shielding plates 51, 52 are positioned so as to completely overlap each other (in the state of FIG. 2A). Thus, the quantity of luminous flux passing through the PBS plate 13 is maximized.

Though the second light-shielding plate 52 is thus moved by ½ of the slit width in a direction perpendicular to the optical axis in the moving mechanism shown in FIG. 9, the amount of movement is not restricted to ½ of the slit width and can be set to ¼ or ¾ of the slit width, for example.

In the embodiment shown in FIG. 9, a microphotosensor 107 is provided for detecting the position of the second light-shielding plate 52 when the latter descends. When the second light-shielding plate 52 is detected thereby, a detection signal is fed back to a driving control section.

The moving mechanism shown in FIG. 10 will now be explained. This moving mechanism is configured such that a second light-shielding plate 62 is continuously moved in the directions of arrows B (see FIG. 1), so that the brightness of illumination light can be changed continuously. Here, first and second light-shielding plates 61, 62 are configured as in the above-mentioned first and second light-shielding plates 51, 52. As depicted, a gear 121 rotates as a stepping motor 111 rotates, whereby a gear 123 rotates by way of a planetary gear 122. The gear 123 is attached to the outer periphery of an axis 124, whereby the axis 124 rotates as the gear 123 rotates.

On the other hand, a light-shielding-plate holding member 126 holding a side edge portion of the second light-shielding plate 62 is equipped with a mating part 125 to mate the axis 124. Though not depicted, the inner wall of the mating part 125 and the outer wall of the axis 124 are provided with respective gears in mesh with each other. Therefore, when the axis 124 rotates as the motor 111 rotates, the light-shielding-plate holding member 126 in mesh with the axis 124 moves in the directions of arrows B (see FIG. 1). Consequently, as in the embodiment shown in FIG. 9, the overlapping area between the respective slits of the first and second light-shielding plates 61, 62 is changed, whereby the brightness of illumination light is made variable, and the level of brightness to be adjusted can be changed continuously unlike that of FIG. 9.

Figure 10:
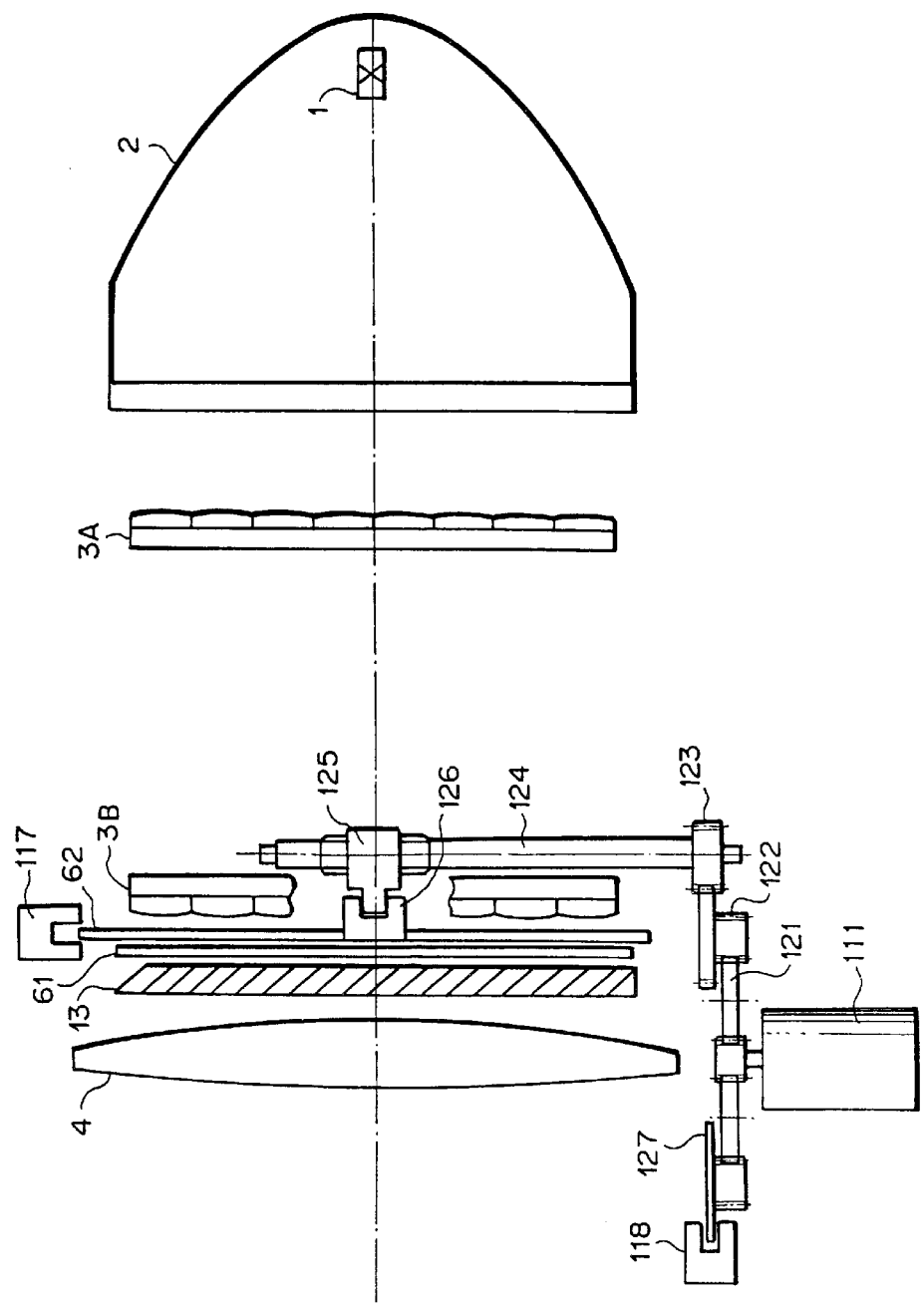
FIG. 10 is a schematic view showing a modified example of the mechanism for moving a light-shielding plate shown in FIG. 9.

As in the moving mechanism shown in FIG. 9, the moving mechanism shown in FIG. 10 is equipped with a microphotosensor 117 for detecting the position of the second light-shielding plate 62 when the latter moves. Further, the moving mechanism shown in FIG. 10 is equipped with a microphotosensor 118 for detecting the rotating position of motor. By detecting the angle of rotation of a perforated disk 127 (having a rotational angle detecting hole at each predetermined angle) which rotates as the motor 111 rotates, the microphotosensor 118 detects the amount of rotation of motor 111.

Without being restricted to the above-mentioned embodiments, the illumination optical system and projection type display apparatus of the present invention can be modified in various manners. For example, though a comb-shaped polarization prism array is used as the PBS plate in the above-mentioned embodiments, other polarization beam splitters may also be used.

The effective luminous flux quantity adjusting means in the apparatus of the present invention is not limited to those adjusting the light quantity by moving members physically. Its examples include those adapted to electrically adjust the light-shielding amount (e.g., liquid crystal shutters), those adapted to adjust the light-shielding amount according to the wavelength of light, and so forth, which are not accompanied with physical movement of members.

Though a pair of flyeyes are disposed in the above-mentioned embodiments, the present invention is also applicable to those in which a plurality of pairs of flyeyes are provided so as to have rotational symmetry about the optical axis.

The present invention is also applicable to light valves other than liquid panels, e.g., a display apparatus using a DMD.

In the illumination optical system and projection type display apparatus of the present invention, as explained in the foregoing, a structure adapted to adjust the effective luminous flux diameter of illumination light on a light valve is provided near an integrator unit for homogenizing a luminous flux from a light source.

Since positions near the integrator plate located on the light valve side are set so as to be optically conjugate with the pupil position of a projection lens, regulating a luminous flux near this integrator plate can control the brightness of illumination light quite effectively as in the case where the projection lens is provided with a stop so as to regulate the luminous flux.

When the luminous flux is adjusted by the integrator unit, the luminous flux is in a state carrying no image information, whereby errors in its adjustment can affect the image quality very little.

Also, since the integrator unit is cooled by a cooling structure inherently disposed in the illumination optical system, it is not necessary to provide separate cooling structures, whereby a higher efficiency can be attained in terms of cost and space.

What is claimed is:

1. An illumination optical system comprising:
    a light source unit;
    an integrator unit in which a plurality of integrator plates each comprising a number of lens arrays arranged two-dimensionally are disposed so as to homogenize a luminous flux from said light source unit; and
    a light valve for modulating light from said integrator unit according to predetermined image information and outputting thus modulated light;
    wherein luminous flux variable means for adjusting a light quantity caused by an effective luminous flux on said light valve is disposed within or near said integrator unit.

2. An illumination optical system according to claim 1, wherein a polarization beam splitter constituted of a comb-shaped polarization separating prism array and a ½ wavelength plate is disposed between said light valve and said integrator unit; and
    wherein a light-shielding plate is made movable in a direction in which said light quantity caused by said effective luminous flux on said light valve is adjustable.

3. An illumination optical system according to claim 2, wherein a light shielding plate moves together with said polarization beam splitter.

4. An illumination optical system according to claim 1, wherein a polarization beam splitter constituted of a comb-shaped polarization separating prism array and a ½ wavelength plate is disposed between said light valve and said integrator unit; and
    wherein a light-shielding plate is disposed between said integrator unit and said polarization beam splitter, and made movable in a direction orthogonal to an optical axis so as to adjust a quantity of light incident on said polarization beam splitter.

5. An illumination optical system according to claim 1, wherein a light-shielding plate is disposed between said light valve and said integrator unit and made movable in a direction orthogonal to an optical axis so as to adjust a quantity of light emitted from said integrator unit.

6. An illumination optical system according to claim 1, wherein, among a plurality of integrator plates constituting said integrator unit, at least one of said integrator plates is provided with effective luminous flux quantity adjusting means for adjusting said light quantity caused by said effective luminous flux on said light valve.

7. A projection type display apparatus comprising the illumination optical system according to claim 1, and a projection lens for projecting onto a screen an optical image carried by light modulated by said light valve.

8. An illumination optical system comprising:
    a light source unit;
    an integrator unit in which a plurality of integrator plates each comprising a number of lens arrays arranged two-dimensionally are disposed so as to homogenize a luminous flux from said light source unit; and a light valve for modulating light from said integrator unit according to predetermined image information and outputting thus modulated light, wherein, among a plurality of integrator plates constituting said integrator unit, at least one pair of said integrator plates is arranged in an optical axis direction have a distance therebetween which is changeable so as to adjust a light quantity caused by an effective luminous flux on said light valve.

9. A projection type display apparatus comprising the illumination optical system according to claim 8, and a projection lens for projecting onto a screen an optical image carried by light modulated by said light valve.

* * * * *